3,156,540
MEANS FOR REGULATING THE HEAT SUPPLY DURING THE DRYING OF PAPER
Jean Georges Baert, 48 Rue de Lisbonne, Paris, France
Filed Feb. 15, 1960, Ser. No. 8,780
Claims priority, application France, Feb. 17, 1959, 787,113, Patent 1,229,781; Oct. 28, 1959, 808,702
1 Claim. (Cl. 34—48)

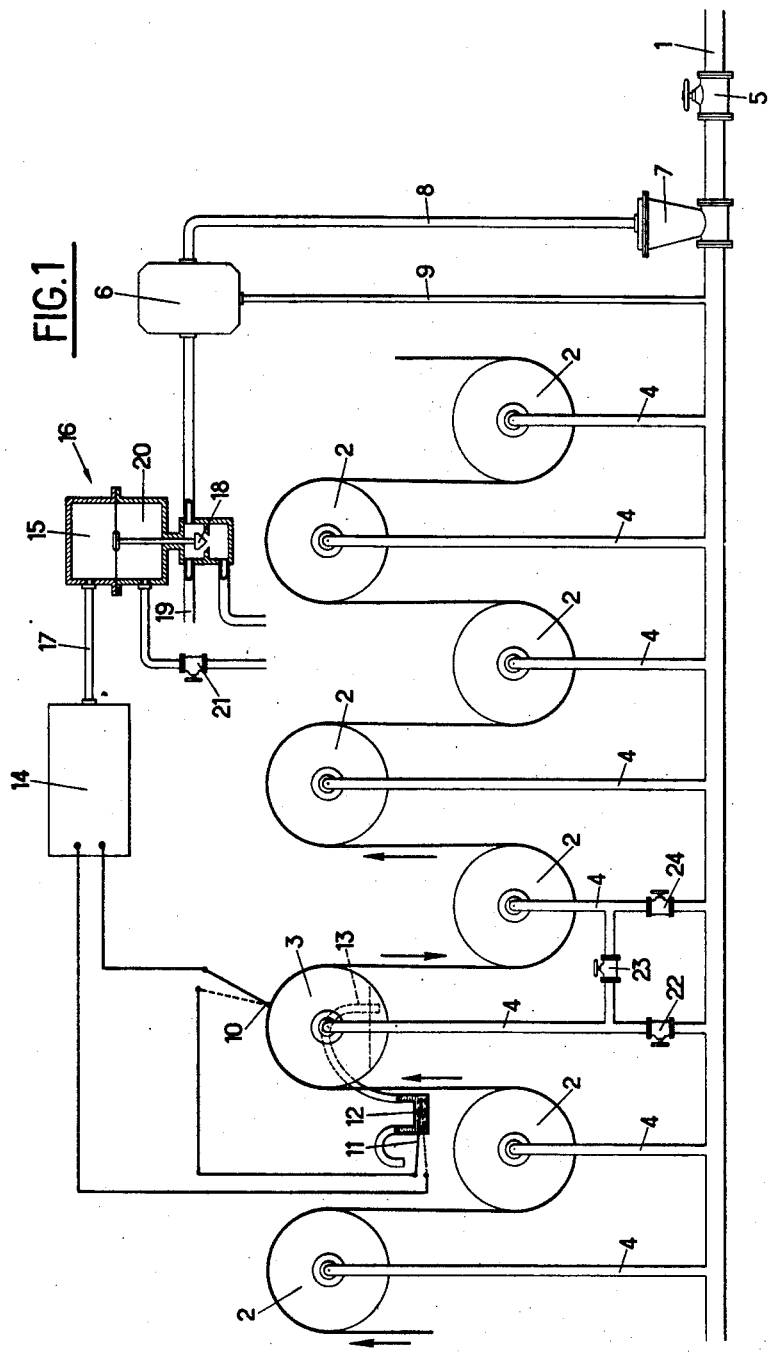

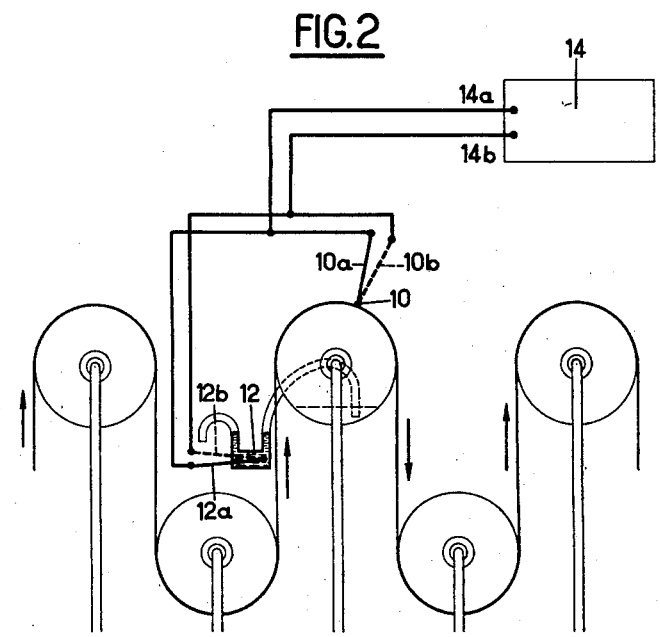

It is known that one of the last steps in the manufacture of paper consists of drying it to a predetermined point. It is desirable for this point to be located between well established limits, either to permit the paper to be subsequently subjected to certain treatments, or to produce a paper having certain good mechanical characteristics.

The present invention relates to multi-cylinder machines of the Fourdrinier type which comprise a series of cylinders heated by circulating air and over which the paper to be dried is wound.

The object of the present invention is to provide a new article of manufacture which consists of a paper making machine of this type characterized by the fact that it comprises means such as thermocouples for measuring a value proportional to the quantity of heat supplied to the paper being dried by a specific cylinder. An indication of the value proportional to the quantity of heat is then fed into a modulator for comparison with a fixed value which is adjustable as a function of the degree of dryness which it is desired to obtain and the result of this comparison is a physical signal acting on the regulator which delivers the heating fluid to the machine.

In accordance with the invention, it is preferable for the cylinder at which the measurement of a value proportional to the supply of heat takes place (hereinafter referred to as the "pilot cylinder") be the one which communicates to the sheet of paper a temperature near the maximum temperature attained by the sheet. In effect, it is known that during the drying cycle the paper is subjected to increasing temperatures (for example, from 70° to 115° C.).

In a first embodiment of the invention the measure of the value proportional to the supply of heat furnished to the paper by the pilot cylinder is effectuated by means of two thermocouples connected in series, one of these thermocouples having its junction situated on the outer periphery of the cylinder (that is to say, as close as possible to the surface of the sheet of paper which is in contact with the cylinder) the junction of the other thermocouple being positioned in a place having a stable temperature and representing as closely as possible the average instantaneous temperature of the inner surface of the cylinder.

It is known that the cylinders are supplied by means of a saturating vapor, the water of condensation running along the inner wall of the cylinder. The junction of the second thermocouple may be positioned in the run-off water which accumulates in the lower part of the cylinder, or when this water is drained from the cylinder, in a siphon through which the water of condensation runs, or at any other point located within the interior of the pilot cylinder.

It will be seen that under these conditions the potential difference generated by the two thermocouples located in the manner described is proportional to the quantity of heat transferred from the pilot cylinder to the sheet of paper.

In a second embodiment of the invention the measurement of the value dependent on the supply of heat furnished to the paper by the pilot cylinder is accomplished by means of two thermocouples connected in parallel, one of these thermocouples having its junction positioned on the outer periphery of the cylinder, that is to say, as close as possible to the surface of the sheet of paper which is in contact with the cylinder, the other thermocouple being positioned in a place having a stable temperature representing as accurately as possible the average instantaneous temperature of the inner surface of the cylinder.

When the thermocouples are thus connected in parallel, the signals which they supply to the regulating means are a function of both the difference between the temperatures on the two surfaces of the pilot cylinder on the one hand and of the temperature or thermal level prevailing in the interior of the pilot cylinder.

When the unrolling of the sheet of paper proceeds in an approximately normal manner, the temperature prevailing in the interior of the cylinder will undergo only small and slow variations. The signals given by the thermocouples to the regulating means will then vary with the difference between the temperatures of the inner and outer surfaces of the pilot cylinder wall.

On the other hand, when there is a large disturbance resulting, for example, from the breaking of the sheet of paper being dried, the signals furnished by the thermocouples to the regulating means take into account not only the differences in temperature between the two surfaces of the pilot cylinder wall, but also the substantial variations which necessarily follow in the value of the temperature prevailing in the interior of the pilot cylinder.

It will be appreciated that under these conditions the second embodiment of the invention permits the temperature or thermal level prevailing in the interior of the pilot cylinder to be maintained at a controlled and substantially constant value.

In a preferred embodiment of the invention, the voltage supplied by the thermocouples (connected either in series or in parallel) is transformed into a static air pressure which may vary, for example, from 0.2 to 1.0 kg./cm.$^2$, although these specific limits are not essential.

In this embodiment, the static pressure acts on a modulator which, by comparing this pressure to a reference pressure which may be regulated in any desired manner, assures a supply of air which is directly proportional to the heat supplied to the pilot cylinder. A static pressure induced by this air supply finally acts on the setting of control means which controls the supply of a heating fluid to the various cylinders. This heating fluid should have substantially constant physical characteristics.

In order that the invention may be more readily understood, I will now describe, purely by way of illustration, and without limiting the scope of my invention to the details thereof, two embodiments of my invention which are schematically illustrated on the accompanying drawings.

On these drawings:

FIG. 1 represents a schematic view of the first embodiment of my invention, and

FIG. 2 represents a partial view of apparatus according to a second embodiment of my invention.

On FIG. 1 the pipe 1 leads the vapor to the cylinders 2 and to pilot cylinder 3 through intermediate pipes 4.

The valve 5 permits the supply of vapor to be cut off and the control means 6 acts on the remotely controlled valve 7 through the pipe 8 in accordance with the physical indications of the characteristics of the vapor distributed to the cylinders, which indications are transmitted through the pipe 9.

Such an arrangement permits the different cylinders to be supplied with a vapor having predetermined characteristics which may be arbitrarily chosen within certain limits and which act upon the setting of regulator 6.

In accordance with the invention a thermocouple 10 is positioned on the outer surface of the pilot cylinder 3, while another thermocouple 11 is submerged in the water 12 drained from the interior of cylinder 3 by means of siphon 13, the average temperature of the water 12 varying with the temperature prevailing in the interior of the pilot cylinder.

On FIG. 1, which shows a first embodiment of the invention, the two thermocouples 10 and 11 are connected in series and to a device 14 of a known type, which converts the voltage difference to a static pressure transmitted to the closed chamber 15 of the modulator 16 through pipe 17.

The modulator 16 is also of a known type and permits the supply of air in the pipe 19 to be varied by means of the valve 18 as a function of the difference between the pressure in the chamber 15 and that in the chamber 20. The latter pressure may be adjusted to the desired value by use of regulating means 21.

Finally, the modulator 16 is connected to regulator 6 to adjust the setting of the latter as a function of the static pressure prevailing in the upper chamber of the valve 18.

In accordance with the invention, the supply line to the pilot cylinder 3 is connected to the cylinder which immediately follows it, through the valves 22, 23 and 24 which permit variation of the vapor supply to the pilot cylinder so as to regulate the time of thermal response to obtain the desired degree of sensitivity.

The apparatus functions in the following manner:

If it be supposed that, for any reason, the paper is too dry (the speed of travel being too slow, the paper being thinner, the felts being too dry, and the vacuum in the presses being increased, etc.), this means that the cylinders in general, and the pilot cylinder in particular, are transferring too much heat to the paper. This quantity of heat is measured by the difference between the voltage at the terminals of the thermocouples 10 and 11 and results in a variation of pressure in the chamber 15. This leads to a variation in the flow of air in the pipe 19 and a change in the setting of regulator 6 which automatically decreases the supply of vapor fed to the installation. This decrease in supply has the effect of reducing the quantity of heat transferred to the paper and consequently results in a paper which is less dry. The regulating mechanism would act inversely if the paper were too moist.

It will be noted that, in accordance with the invention, the degree of dryness of the paper may be regulated by acting on the control means 21 which determines the reference pressure prevailing in the chamber 20 of the modulator 16.

The apparatus embodying the invention offers in addition great flexibility of operation, great accuracy and complete safety. In fact, if it be supposed, for example, that the paper being dried breaks, in a normal installation a workman supervising the apparatus must immediately close the valve 5 to stop the supply of heating fluid. In the apparatus embodying the invention the failure of paper to contact the pilot cylinder 3 results in a very substantial diminution in the flow of heat which acts, as has been previously indicated, on the regulator 6, and results in immediate closing of the remotely controlled valve 7.

On FIG. 2, which represents a second embodiment of the invention, the heavy lines indicate the electric circuits connecting the two thermocouples 10 and 11 to the device 14 which converts the voltage difference into a static pressure, and the thinner lines a part of the paper making machine which is otherwise identical with the one shown in connection with the first embodiment.

It will be seen that on FIG. 2 the branches 12a and 10a of the thermocouples 12 and 10 are connected together, as are the branches 12b and 10b of the same thermocouples.

The branches 10a, 12a, and 10b, 12b are then respectively connected to the terminals 14a and 14b of the device 14. In this manner the thermocouples are connected in parallel to act on the device 14.

Of course, the foregoing device has been described purely by way of example, and may be modified as to detail without thereby departing from the spirit of my invention.

In particular, it is obvious that the supply of heat to the pilot cylinder may be measured by any other suitable means. Thermometers of any type may be used, such for example as electric resistance thermometers, fluid pressure thermometers, or thermostats relying on metallic expansion.

It is also obvious that while in the embodiment described the control signal is transmitted partially by means of electricity and partially pneumatically, it is possible to devise apparatus for carrying out the invention by means of exclusively electric or exclusively pneumatic signals, or signals of any other type (hydraulic, for example).

Finally it will be understood that apparatus embodying the invention may also be utilized outside the paper making field, and particularly whenever it is necessary to maintain at a constant figure the degree of dryness of a continuously moving product.

I claim:

A paper making machine of the Fourdrinier type comprising a plurality of drying cylinders in heat transfer relationship with said paper, a supply pipe with branches individually supplying each cylinder with a heated vapor in proportions maintaining some of said cylinders hotter than others, signal responsive means for regulating the flow of vapor in said supply pipe, means for providing a continuing physical signal which is a function of the quantity of heat actually transferred to said paper by a selected one of said hotter cylinders, means for providing a continuing physical reference signal indicative of a predetermined quantity of heat transferred from said selected cylinder, and means for comparing said physical signals and transmitting a signal indicative of the difference therebetween to said flow regulating means for regulation of the supply of heated fluid to said cylinders, the branch leading to said selected cylinder and the branch leading to an adjacent cylinder being provided with valves and being connected intermediate said valves and cylinders by a connecting pipe also provided with a valve, thus permitting individual regulation of the speed at which said vapor is supplied to said selected cylinder.

References Cited in the file of this patent

UNITED STATES PATENTS

| | | |
|---|---|---|
| 1,107,737 | Witham | Aug. 18, 1914 |
| 2,074,455 | Carleton | Mar. 23, 1937 |
| 2,102,106 | Allen | Dec. 14, 1937 |
| 2,611,974 | Stratveit | Sept. 30, 1952 |
| 2,659,987 | Bennett | Nov. 24, 1953 |
| 3,016,622 | Gade | Jan. 16, 1962 |

OTHER REFERENCES

Instrumentation vol. 4, 1949, #1.